2,716,425

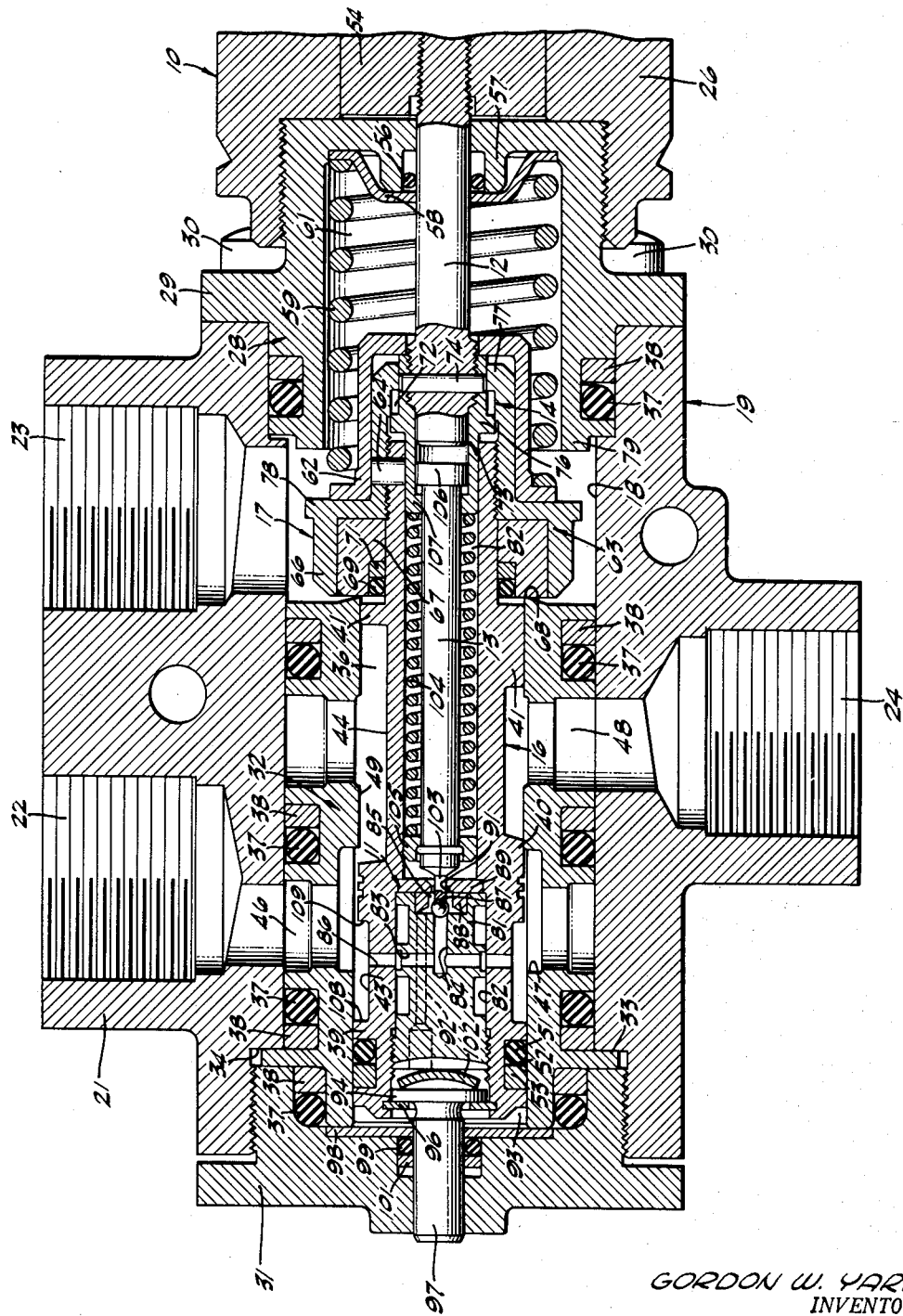
Aug. 30, 1955     G. W. YARBER     2,716,425
PILOT-OPERATED VALVE
Filed Sept. 22, 1953
GORDON W. YARBER
INVENTOR.
BY
ATTORNEY United States Patent Office 2,716,425
Patented Aug. 30, 1955

PILOT-OPERATED VALVE

Gordon W. Yarber, Sherman Oaks, Calif., assignor to Hydro-Aire, Inc., Burbank, Calif., a corporation of California Application September 22, 1953, Serial No. 381,635

4 Claims. (Cl. 137—620)

This invention relates to a pilot-operated valve, and particularly to a combination slide and poppet valve which operates as a servo-mechanism to transform a relatively weak pilot force into a strong valve-shifting force.

In many present day pneumatic or hydraulic systems, for example the pneumatic systems incorporated in relatively large and complex airplanes, it is necessary that a valve be shifted by an operator located a relatively great distance away. Such a situation occurs, for example, where the pneumatically operated brakes of an airplane are operated by a pilot sitting in the pilot's seat or compartment. A conventional method of transmitting a signal from the pilot to operate an element such as a brake is to employ an electric circuit and solenoid arrangement, with the solenoid shifting the valve after the pilot has closed the solenoid circuit. The use of such a simple solenoid-operated valve is, however, subject to certain important limitations where, as in many braking systems, the brake-operating fluid is under high pressures on the order of 3000 pounds per square inch. This is because the sealing means necessarily incorporated in valves designed to operate at such high pressures greatly increase the frictional resistance tending to prevent valve shifting, so that the solenoid or other actuating element must be made excessively large in order to create the necessary valve-operating force.

In view of the above problems characterizing the field of valves such as are utilized to effect braking of airplane wheels, it is an object of the present invention to provide a valve constructed as a servo-mechanism to multiply the valve-shifting force which a pilot portion of the valve, for example a solenoid, exerts upon being energized by an operator disposed remote therefrom.

Another object of the invention is to provide a pilot-operated valve incorporating both slide and poppet elements to conduct air through an inlet passage and a brake passage to the air plane brake mechanism, and when in another position to block the inlet passage and permit exhausting of the air through the brake passage and an outlet passage.

A further object of the invention is to provide a pilot-operated valve exerting a greater force to shift the valve in one direction than in the reverse direction to compensate for variations in the amount of friction created by the valve-sealing means during valve shifting in the initial and reverse directions.

Another object of the invention is to provide a servo-mechanism in which the pilot element is operative to shift the valve even in the absence of any inlet pressure.

These and other objects and advantages of the invention will be more fully appreciated upon a reading of the following specification and claims, considered in connection with the attached drawing which shows the pilot-operated valve in longitudinal central section.

Referring to the drawing, the pilot-operated valve may be divided generally into a pilot element 10, a servo valve and passage system 11 operated by pilot element 10 acting through a pair of axially aligned rods 12 and 13 connected by a lost motion connection 14, and interrelated slide and poppet valve elements 16 and 17 operable both by servo arrangement 11 and directly by rod 12. With the exception of pilot element 10, all of the above recited elements are mounted in the cylindrical central passage 18 of an elongated valve casing 19, the latter having a relatively thick boss portion 21 provided with longitudinally spaced inlet and outlet ports 22 and 23, respectively. Inlet port 22 is threaded for connection to a suitable source of fluid under high pressure, for example air at 3000 pounds per square inch, and transmits the air under the control of slide element 16 to a passage or port 24 formed in casing 19 diametrically opposite boss 21 and midway between ports 22 and 23. Port 24 is adapted to be connected to a pneumatically operated element such as the brakes of an airplane or to a cylinder. As will be described in detail subsequently, operation of slide valve element 16 to block inlet port 22 and open poppet valve 17 releases the pressure in the pneumatically operated airplane brakes, permitting the air to exhaust or vent back through port 24, the poppet valve 17, and out port 23 to a suitable discharge point.

Pilot element 10 may be any suitable actuating device but is preferably a solenoid, not shown, mounted in a cylindrical casing 26 at the end of valve casing 19 which is remote from inlet port 22. Solenoid casing 26, only a portion of which is illustrated, is threaded over the outer or bottom portion of an end cup 28, the rim portion of which is inserted into the end of valve casing 19. In order to hold end cup 28 and solenoid casing 26 in rigidly mounted position at the end of valve casing 19, the end cup is provided with an external central flange 29 adapted to receive screws 30 extending through the flange and into the abutting casing end.

A somewhat similar mounting and retaining arrangement is provided at the other end of valve casing 19, adjacent port 22, by threading an end plug 31 into the casing to hold a cylindrical bushing 32 in position by pressing a flange 33 on the bushing against a shoulder portion 34 of passage 18. Bushing 32 extends longitudinally of passage 18 from end plug 31 to adjacent outlet port 23 and is there spaced from the rim of the opposed end cup 28 to provide mounting room for poppet element 17, the latter serving to control the flow of fluid through an axial passage 36 in bushing 32.

To make the flow of fluid between ports 22, 23 and 24 completely dependent upon valve elements 16 and 17, a substantial number of O-ring type seals 37 and cooperating back-up rings 38 are provided along the wall of valve passage 18. The O-rings and back-up rings 37 and 38 are mounted in corresponding annular grooves in the external surface of bushing 32 as well as in end cup 28 and plug 31, there being an O-ring disposed to prevent leakage along any portion of the wall of passage 18 where such leakage might occur.

The slide element 16, which as previously indicated controls the flow from inlet port 22 to the brake or cylinder port 24, is mounted longitudinally of the full length of passage 36 in bushing 32 and extends out of the end of passage 36 adjacent outlet port 23 to provide a mounting for poppet element 17. Slide 16 is formed with three annular flange portions 39, 40 and 41 separated by annular grooves 43 and 44, the walls of the groove 44 being specially inclined relative to the axis of slide 16 to provide the desired valve action when the slide is shifted between its two operating positions. When slide 16 is in the position illustrated in the drawing a fluid path is provided from inlet port 22, through a port 46 in bushing 32, thence into a communicating annular groove 47 in the bushing and into the annular slide groove 44. From groove 44 the fluid flows through a port 48 in bushing 32 and out the port 24 leading to the cylinder or brake mechanism. Upon shifting of slide 16 to the right the slide flange 40 engages a bushing wall portion 49 about its full circumference to completely block the fluid flow between ports 22 and 24. Leakage of fluid past the flange 39 at the other side of bushing groove 43 is then prevented by an O-ring 51 mounted in a groove 52 in flange 39 adjacent a cooperating back-up ring 53. Because of the extremely high pressure applied to the inlet port 22, the O-ring 51 is compressed to provide a very substantial amount of frictional resistance tending to prevent sliding of element 16. This frictional resistance is greater when the slide 16 is moved to the right to block the fluid path from port 22 to port 24 than when the slide is shifted in the reverse direction to again permit fluid flow along the previously described path.

It may be well at this point to emphasize that the varying frictional resistance created by O-ring 51 is extremely important in the operation of the valve. When slide 16 moves to the right the O-ring 51, which is greatly compressed against back-up 53 under the high fluid pressure from port 22, tends to bind against the bushing wall and create a large amount of friction. When, on the other hand, slide 16 moves to the left or in the direction of the fluid pressure at O-ring 51 instead of against it, the binding tendency is reduced or eliminated and the friction created by O-ring 51 is greatly lessened. It is pointed out that if the slide 16 were balanced completely, with an O-ring on flange 41 as well as on flange 39, the varying O-ring friction would be unimportant since the reduced friction presented by one O-ring when the slide is moving in a given direction would be offset by the increased friction presented by the other O-ring. With the present slide valve-poppet construction, however, there can and should be no O-ring on flange 41, so that other means are provided to offset the varying friction presented by O-ring 51.

For purposes of simplicity of explanation, there will first be described the elements which would operate if there were no servo-mechanism in the system. All of the valve-shifting force would then come from the solenoid in casing 10, there being no servo-operation of the type to be described subsequently.

The solenoid in casing 10 operates, when energized, to shift a centrally disposed solenoid plunger or core 54 to the right, the core 54 having the outer end of rod 12 threaded therein so that the rod is also shifted to the right upon solenoid energization. From core 54 rod 12 extends axially inwardly through a central aperture in the bottom of end cup 28 to the lost motion connection 14, there being a suitable sealing ring 56 mounted in an annular ridge 57 in the cup bottom to prevent leakage of fluid therethrough. A sealing or seating disc 58 in the cup bottom serves to retain the O-ring 56 in position and to provide a seat for a helical compression spring 59 disposed in the chamber 61 within cup 28. At its other end spring 59 is seated on the flange of a spring cup 62 fitted over poppet valve 17 to bias it toward seated position at one end of bushing passage 36.

More specifically, cup 62 is fitted over the outer end of a correspondingly shaped back-up ring or cup 63 which is threadedly connected to the end of slide 16 and held against rotation relative thereto by means of a pin 64. Back-up element 63 forms part of the poppet valve 17 and also the lost motion connection 14. In its capacity as part of poppet element 17 the member 63 is formed with an axially extending flange or rim 66 fitted over a poppet ring 67 to maintain it in position against a relatively sharp valve seat portion 68 of bushing 32 when the poppet 17 is in closed position as illustrated. Poppet ring 67 is preferably of a soft material such as nylon to permit the grooving of the seat-engaging poppet portion into a sealing groove upon repeated opening and closing of the poppet, and is suitably formed to permit seating of an O-ring 69 and retaining ring 71 adapted to prevent the leakage of fluid along the outer slide surface. In its capacity as part of lost motion connection 14 the apertured outer end of element 63 is spaced a substantial distance from the outer end of slide 16 to form a chamber 72 through which extends a hollow cylindrical connecting element 73. Connecting element 73 is threaded over the end of rod 12 leading to solenoid core 54 and is held against rotation by a pin 74 passing through the rod 12.

It will be noted that the outer end of connecting element 73 seats against the apertured bottom of spring cup 62 so that upon shifting of rod 12 to the right the cup 62 will be immediately slid along the cooperating surface of element 63 to compress the return spring 59 and free poppet 17 for opening. However, after solenoid core 54, rod 12, connecting element 73, and cup 62 have thus shifted to the right for a substantial distance, an annular flange 76 on the external surface of the connecting element 73 will engage the necked down outer end 77 of member 63 to prevent additional relative movement between the connecting element 73 and the poppet valve 17. After this initial lost motion interval, further shifting of rod 12 and connecting element 73 to the right will lift the poppet off its seat 68. The opening motion of the poppet will continue, with the spring cup 62 moving in advance of the poppet by a distance equal to the space between flange 76 and neck portion 77, until an annular stop portion 78 of element 63 engages the rim end 79 of cup 28. The cup 62, however, does not engage rim 79 but instead remains in advance of the element 63 and is actuated into the chamber 61 within cup 28 for a distance governed by the length of stroke of solenoid core 54. Return shifting of the poppet and slide valve elements is effected, upon de-energization of the solenoid, by spring 59.

During the described opening of poppet valve 17 the air in the brake element connected to port 24 of the valve does not immediately rush through the poppet and out the port 23. This is because the flange 41 which forms one wall of slide groove 44 initially blocks such outrushing of air, and it is only when a relatively thin portion of the flange is shifted past the valve seat 68 that the valve is completely opened. Even when the poppet is completely opened and the stop 78 engaged with cup end 79, the relatively wide portion of flange 41, which is formed by inclining the wall of groove 44 as previously indicated, is engaged with the corresponding wall of bushing passage 36 and serves to maintain the alignment of the slide in the bushing.

In addition to the above, a purpose of the flange 41 is to prevent the rushing of air from inlet port 22 to outlet port 23 before the inlet port is blocked by the slide flange 40 as previously described. With the present arrangement the slide flange 41 prevents the opening of the poppet 17 from being completely effective until the inlet port 22 of the valve is effectively blocked by slide flange 40.

Proceeding now to a description of the servo means for operating the valve, the servo valve and passage arrangement 11 comprises a cylindrical plug 81 threaded into one end of an axial passage 82 which extends for the full length of slide element 16. Plug 81 is formed with a radial bore 83 and a communicating axial bore 84 extending to a chamber port 85 at the inner end of the plug. Transverse bore 83 registers with a port 86 in slide 16 leading to the grooved portion 43 of the slide, the latter in turn communicating at all times with groove 47 in bushing 32 and thus with the ports 46 and 22 leading to the fluid pressure source.

To control the pressure thus present at chamber 85 a ball 87 is provided in the chamber and caged by means of a suitable seating ring 88 and by an end disc 89 which is seated between the inner end of plug 81 and a shoulder portion of the slide. Disc 89 is provided with an axial exhaust port 91 of substantially the same diameter as the passage 84, both of the diameters being somewhat less than that of ball 87 so that the ball may alternately seat on the end of passage 84 and on port 91 to block them.

An offset longitudinal passage 92 extends for the full length of the plug 81 to transmit fluid from chamber 85 to a chamber 93 at the end of passage 36 adjacent the outer end of the slide 16. In passing from the outer end of passage 92 to the chamber 93 the air flows around a disc 94 and an adjacent retaining ring 96, the ring 96 being seated in an annular groove in the inner wall of slide 16 and serving to maintain the disc 94 in position adjacent the threaded connection between plug 81 and the slide. Disc 94 forms part of an emergency actuating arrangement consisting of a rod 97 integral with disc 94 and extending from it outwardly through retaining ring 96 and a gasket 98 on the inner surface of plug 31. From gasket 98 rod 97 projects past a suitable O-ring 99 and retaining ring 101 and through the center portion of end plug 31. In an emergency the rod 97 may be manually or automatically operated to shift disc 94 to the right and thus displace, by means of a dished element 102, the correspondingly dished end of plug 81 to shift slide 16 between its brake-actuating and exhaust positions.

When the ball 87 is not restrained in any way it tends, because of the incoming pressure, to seat on the exhaust port 91 and block the fluid path therethrough. A fluid path through chamber 85 between the passages 84 and 92 is thus opened since ball 87 is remote from passage 84. Fluid from inlet port 22 of the valve then flows through port 46 in the bushing, port 86 in the slide, passages 83 and 84 in plug 81, and through the previously described path from passage 92 around the disc 94 and retaining ring 96 to the chamber 93 at the end of the valve. The resulting increase in the pressure in chamber 93 operates to shift the slide 16 to the right and overcome the high frictional resistance created by O-ring 51 when the slide is shifted against the high fluid pressure in the system. When, however, the ball 87 is pressed to a seat on the end of passage 84, the air in chamber 93 is vented through passage 92 and the now open exhaust port 91, the slide 16 then being free for actuation to the initial position illustrated in the drawing.

According to the invention, the shifting of the ball between its two seated positions is effected by the rod 13 which is disposed axially of the slide passage 82 and displaced by means of the solenoid plunger 54 and rod 12 acting through the lost motion connection 14. For this purpose the end of rod 13 is provided with a pointed or needle portion 103 having a dished end corresponding to the curvature of ball 87. Ball 87 is thus firmly held against the end of passage 84 when the valve is in the position illustrated, that is to say, with the needle portion 103 extending loosely through port 91 and into chamber 85 to engage the ball. In order to bias rod 13 and ball 87 to the position illustrated, a helical compression spring 104 is provided around rod 13 and seated between a suitable ring 105 on rod 13 and the inner end of connecting element 73, the latter being slidably inserted into slide passage 82 as shown.

The portion of lost motion connection 14 relating rod 13 and connecting element 73 comprises a disc or flange 106 formed at the end of rod 13 adajacent rod 12, the disc 106 being disposed in a chamber formed in the portion of connecting element 73 which extends into slide passage 82. When the valve is in the position illustrated, the disc 106 is spaced a slight distance from the necked down inner rod 107 of connecting element 73 so that the connecting element 73 must travel a slight distance to the right before shifting the rod 13. Because of the space between disc 106 and neck end 107, the spring 104 is always permitted to move rod 13 a distance sufficient to seat ball 87 as shown.

The distance between disc 106 and neck portion 107 of lost motion connection 14 is substantially less than the distance between flange 76 and the neck 77 of element 63. Furthermore, the difference between these distances is at least equal to, and preferably substantially the same as, the distance which the needle end 103 of rod 13 must move to permit seating of ball 87 on exhaust port 91.

In the operation of the pilot-operated valve, let it be assumed that inlet port 22 is connected to a source of high fluid pressure, for example air at a pressure of 3000 pounds per square inch, and that port 24 is connected to the air chamber of an airplane brake mechanism. When the valve components are in the position illustrated an air path is completed from inlet port 22 through bushing port 46, groove 44 in slide 16, and ports 48 and 24 to maintain the airplane brake in braking position. At this time the poppet element is seated on the valve seat 68 to block the outlet passage 23 so that air may not flow to the outlet passage from either inlet port 22 or brake port 24.

Upon energization of the solenoid in casing 10, solenoid core 54 is shifted to the right. As the rod 12 connected to solenoid core 54 is thus shifted, the spring cup 62 is likewise immediately shifted due to the abutment of connecting element 73 with the outer neck portion of the cup 62. Accordingly, the cup 62 and connecting element 73 both move with rod 12 to shift the cup to the right and effect initial compression of return spring 59. After the connecting element 73 has moved for a slight lost motion interval neck 107 engages with disc 106 to effect, upon further shifting of the rod 12 and connecting element 73 to the right, movement of rod 13 against the bias of its return spring 104. Rod 13 is thus shifted a distance sufficient to disengage the needle end 103 from ball 87 and permit it to seat on exhaust port 91. The seating of ball 87 on exhaust port 91 preferably occurs at substantially the same instant that the connecting element flange 76 engages neck 77 of ring 63.

Two forces are then operative to open poppet valve 17 and shift slide 16 to the right. The first of these forces is the direct action of the solenoid core 54 acting through rod 12 and connecting element 73 through engagement of flange 76 with neck 77. This force is relatively small and may be insufficient to actuate the slide when the high pressure from inlet port 22 is operative through compression of O-ring 51 to greatly increase the frictional resistance of the slide to the shifting action. The second force, however, is substantially instantaneously operative to overcome the friction created by O-ring 51 and act in conjunction with the first force to shift slide 16 to the right and effect the valve action. This second force is created by the passage of air through inlet port 22, bushing port 46, annular groove 43, port 86 in the slide, passages 83 and 84 in plug 81, chamber 85, and passage 92 to the outer end of plug 81. The air then flows to the previously described path around disc 94 and retaining ring 96 into chamber 93 to shift slide 16 to the right.

During shifting of slide 16 the flange 76 of connecting element 73 normally remains in engagement with neck portion 77 so that the rod 13 is not permitted to move to its ball-engaging position under the bias of spring 104. Stated otherwise, the length and speed of the solenoid core movement is sufficient to maintain the engaged neck 107 and disc 106 in their outer position during the entire valve-shifting operation. Upon completion of valve shifting, with stop portion 78 engaged with cap rim 79, the spring cup 62 is disposed entirely within cup chamber 61 and is maintained in spaced relation relative to the poppet, the solenoid core 54 being the only force for shifting the spring cup 62 and compressing spring 59.

The poppet valve 17 is thus completely open and the narrow portion of slide flange 41 is spaced outwardly from valve seat 68 to permit exhausting of air from the brake, the air passing through ports 24 and 48, annular groove 44, valve seat 68, valve passage 18, and outlet port 23. As previously stated, the narrow portion of slide flange 41 is not disengaged from poppet seat 68 until flange 40 of the slide seals with the bushing surface 49 to effectively prevent further admission of air from inlet port 22. Accordingly, there will be no wastage of air due to initial rushing from port 22 to port 23 as the poppet leaves its seat.

To return the valve to the initial position illustrated in the drawing, the solenoid is de-energized to release its core 54 and the associated rod 12, so that the return spring 59 immediately seats the flanged rim of cup 62 against element 63. The connecting element 73 and rod 12 are thus shifted inwardly relative to element 63 and slide 16 until neck 107 releases disc 106. The spring 104 then becomes operative to shift rod 13 to the left and press needle end 103 against ball 87 to seat the ball on the end of passage 84. The connection between pressure inlet 22 and chamber 93 is thus blocked, and the pressure in chamber 93 is vented through passage 92 and chamber 85 out the now open exhaust port 91. As soon as the pressure in chamber 93 diminishes sufficiently the spring 59 becomes operative, in combination with pressure means to be described subsequently, to actuate poppet 17 and slide 16 to their initial positions. The exhaust outlet 23 is then blocked, and the inlet port 22 is again in communication with port 24 leading to the brake mechanism.

As previously discussed, the frictional resistance created by O-ring 51 is substantially greater when the slide 16 is shifted to the right than during the return movement just described. Nevertheless, the return friction is substantial and it is a feature of the invention that the bias of spring 59 is aided by fluid pressure from inlet port 22 during the return slide movement. The fluid pressure return operates to overcome the friction created by O-ring 51 during the return movement, so that the necessity of using a relatively strong return spring 59 is eliminated.

The pressure return of slide 16 is accomplished by making the diameter of slide flange 39 greater than that of slide flange 40, the diameters of the corresponding portions of the bushing passage 36 being correspondingly different. Since the radius of the bottom of groove 43 is constant, the outer wall 108 of groove 43 is thus substantially greater in area than the inner groove wall 109, as distinguished from the opposed walls of groove 44 which are equal in area. It follows that the forces acting on the walls of groove 44 are balanced, but that the force against wall 108 of groove 43 will be greater than the force against groove wall 109. There is therefore a substantial resultant force tending at all times to shift slide 16 to its initial position. This resultant force is, however, not as great as the opposing force created when ball 87 is unseated from passage 84 and the pressure in chamber 93 increased because the area of the end of slide 16 is substantially greater than the described difference of groove wall areas. When, therefore, the ball 87 is unseated the pressure in chamber 93 will overcome the resultant force tending to shift slide 16 to the left, so that it is only when ball 87 is seated on passage 84 to vent the pressure in chamber 93 that the slide will be pressure actuated into its initial position.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a servo valve mechanism, a valve casing having a main passage therein an inlet and outlet ports communicating with said main passage, a slide element mounted in said passage and movable longitudinally thereof between first and second positions, said slide being formed with a groove disposed to connect said inlet and outlet ports when said slide is in one of said positions, a chamber formed in said slide element, a first passage in said slide element connecting said chamber and said inlet port, a second passage in said slide element connecting said chamber with one end of said main passage in said casing, a ball mounted in said chamber, and remote control means to alternately dispose said ball in a first position on the end of said first passage and blocking the flow of fluid through said chamber, and in a second position permitting the flow of fluid therethrough and to said one end of said main passage, said ball blocking an exhaust port in said chamber when in said second position; characterized in that said remote control means includes a rod extending longitudinally of said slide element and through said exhaust port to engage said ball, spring means to bias said rod to a position effecting location of said ball in said first position, and solenoid means connected to said rod to actuate the same out of engagement with said ball, the connection between said rod and solenoid means being of the lost motion type.

2. In a servo valve mechanism, a valve casing having a main passage therein and inlet and outlet ports communicating with said passage, a slide element mounted in said passage and slidable between positions creating and blocking a path of fluid flow between said inlet and outlet ports, passage means in said slide element to connect said inlet port to one end of said main passage, valve means to control the flow of fluid through said passage means, actuating means mounted relatively adjacent the other end of said main passage, a first rod mounted axially of said slide and adapted to operate said valve means, a second rod extending from said actuating means to said slide, and lost motion connections between said second rod and said first rod and between said second rod and said slide; said lost motion connections effecting shifting of said first rod after movement of said second rod a first predetermined distance, and effecting shifting of said slide after movement of said second rod a second predetermined distance substantially greater than said first distance.

3. The invention as claimed in claim 2, wherein the difference between said first and second predetermined distances is at least equal to the distance necessary to move said first rod to fully operate said valve means, and wherein means are provided to bias said first rod toward said one end of said main passage and to a position at which said valve means are closed.

4. In a pilot-operated valve, an elongated valve casing having a main central passage and three ports communicating with said main central passage and spaced axially thereof; the first of said ports being adapted to be connected to a source of fluid pressure, the second and intermediate of said ports being adapted to be connected to a device to be fluid operated, and the third of said ports being adapted to exhaust fluid from said fluid-operated device; a valve seat provided in said passage between said second and third ports, a slide mounted in said passage inwardly of said first and second ports and having a portion protruding past said valve seat, a poppet mounted on said protruding portion of said slide and forming, together with said valve seat, a poppet valve; flange and groove means on said slide to provide a fluid path between said first and second ports when said poppet valve is in a closed position and to block said fluid path and provide a second fluid path from said second port to said valve seat upon shifting of the poppet valve to an open position, servo valve and passage means provided in said slide adjacent said first port to selectively admit fluid from said first port to the corresponding end of said main passage, a remote control actuating element mounted on said casing at the other end of said main passage, first and second rods associated, respectively, with said servo means and said remote control element and extending to adjacent said poppet valve, a lost motion connection mounted on said second rod to connect said second rod with said first rod and with said poppet, a spring seating element slidably mounted over said lost motion connection and having a neck portion engaged by the outer end thereof, stop means independent of said spring seating element but limiting the opening movement of said poppet, a first compression spring seated between said seating element and the adjacent end of said main passage, and a second compression spring mounted in said slide to urge said first rod toward said servo means.

References Cited in the file of this patent

UNITED STATES PATENTS

| | | |
|---|---|---|
| 209,503 | Murdock | Oct. 29, 1878 |
| 985,491 | | |
| 1,986,206 | Kennedy | Jan. 1, 1935 |
| 2,097,201 | Renkenberger | Oct. 26, 1937 |
| 2,169,452 | Ricard | Aug. 15, 1939 |
| 2,184,413 | Chiesa | Dec. 26, 1939 |
| 2,641,279 | Baldwin | June 9, 1953 |
| 2,659,197 | Halford | Nov. 17, 1953 |
| 2,670,750 | Reynolds | Mar. 2, 1954 |

FOREIGN PATENTS

| | | |
|---|---|---|
| 985,491 | France | Mar. 14, 1951 |